United States Patent [19]

Bunger

[11] 4,253,557
[45] Mar. 3, 1981

[54] VARIABLE LOAD CLUTCH APPARATUS

[75] Inventor: Dennen J. Bunger, Clinton, N.Y.

[73] Assignee: The Bendix Corporation, Teterboro, N.J.

[21] Appl. No.: 41,676

[22] Filed: May 23, 1979

[51] Int. Cl.³ .................... F16D 43/21; F16D 15/06
[52] U.S. Cl. .......................................... 192/54; 74/6; 192/34; 192/94
[58] Field of Search .................. 192/52, 54, 34, 94, 192/97; 74/6, 7 R, 7 A

[56] References Cited

U.S. PATENT DOCUMENTS

| 1,855,937 | 4/1932 | Callsen | 192/54 |
| 2,356,503 | 8/1944 | Callsen et al. | 74/6 |

FOREIGN PATENT DOCUMENTS 620306 10/1935 Fed. Rep. of Germany ............ 192/54

*Primary Examiner*—Allan D. Herrmann
*Attorney, Agent, or Firm*—Anthony F. Cuoco; William F. Tharnton

[57] ABSTRACT

Apparatus for limiting excessive torque imposed by a driving member on a driven member under impact torque conditions. The apparatus includes clutch means arranged to be loosely set for permitting slippage to reduce the torque upon the instant of impact and to be automatically tightened to carry normal torque thereafter.

7 Claims, 1 Drawing Figure

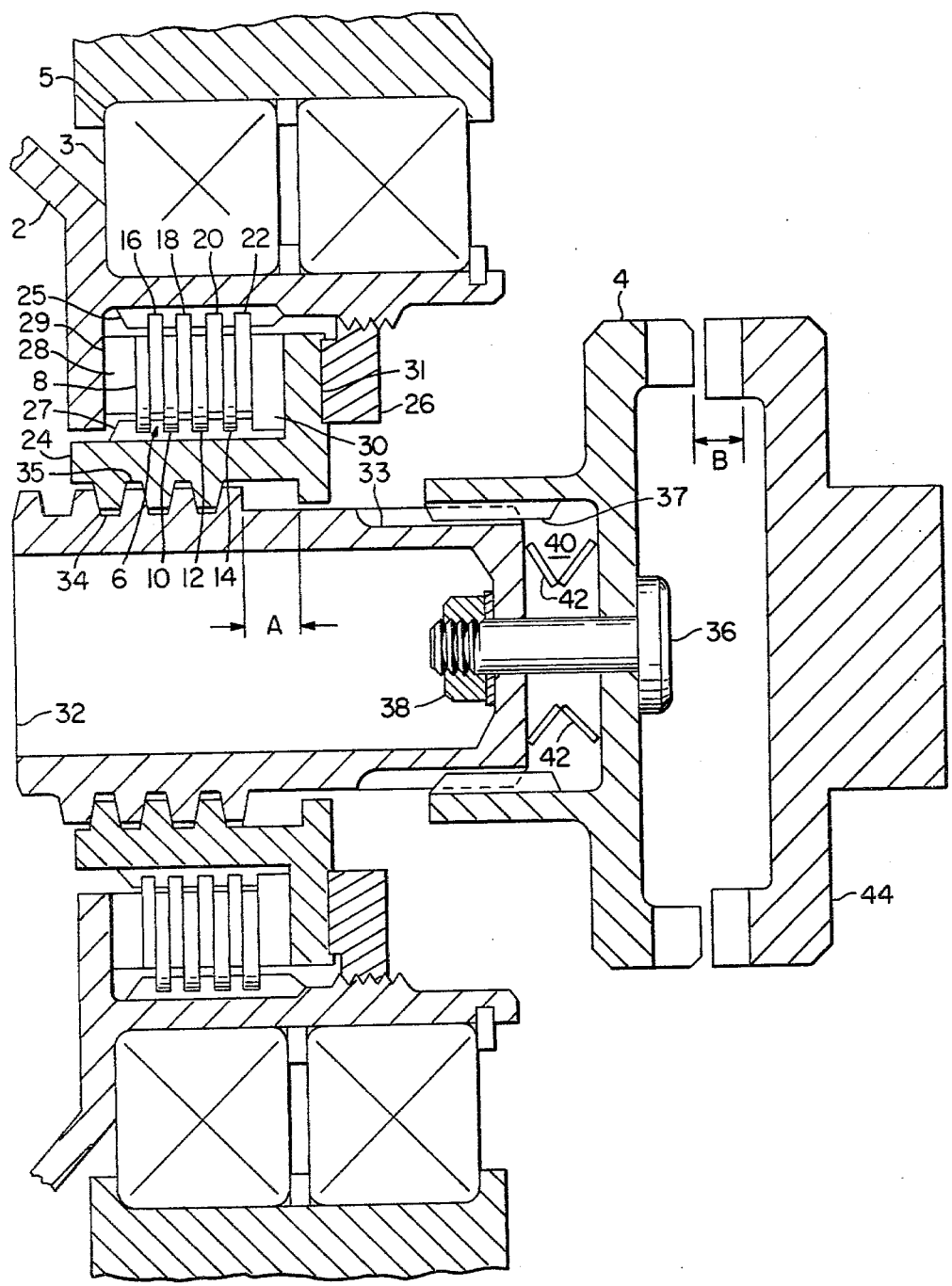

VARIABLE LOAD CLUTCH APPARATUS

FIELD OF THE INVENTION

This invention relates to clutch apparatus and particularly to clutch apparatus for limiting excessive torque imposed by a driving member on a driven member upon impact. More particularly, this invention relates to variable load disc clutch apparatus which minimizes impact torque peaks that are likely to occur.

DESCRIPTION OF THE PRIOR ART

Disc clutches are used in starters, for example, to limit excessive torque imposed by the starter upon the engine being started. The imposed torque has two basic components: (1) the torque developed at the instant of initial engagement of the driving member (starter) with the driven member (engine) and defined as "impact torque"; and (2) the torque developed by the driving member after impact and defined as "normal torque." If either the impact or normal torques exceed the set limits of the clutch, the clutch should slip thereby limiting the torque imposed on the engine components.

It is well known that impact torque exceeds normal torque. Heretofore this has not been of great significance because the strengths of engine components typically exceeded impact torque loads by significant margins. However, as the emphasis on lighter engines increases, the torque absorbing capabilities of the engine components decreases and the impact torque must be minimized.

In order to accomplish this purpose, the exact nature of the impact torque has received close scrutiny. It has been determined that impact torque can be as much as six times that of normal torque. It is desirable, therefore, to limit the impact torque as it frequently exceeds the maximum torque limitations of engine components.

Prior to the present invention disc clutches used for torque limiting purposes have typically employed a threaded adjusting nut which develops a high clamping force across a plurality of discs. Once set, this clamping force is fixed and constant. Experience has demonstrated that clutches set loosely enough to slip under impact torque, slip excessively under normal torque. If the clutch is adjusted tightly enough to prevent slippage under normal torque, slippage does not occur under impact torque. This is attributed to the fact that impact torque occurs as a shock wave over a very brief period (fractions of a second) and clutch components do not have sufficient time to react.

One way of addressing this problem is by employing an arrangement which lightly loads the discs, permitting clutch slippage to reduce impact torque, and then automatically increases the load so that the clutch carries normal torque. One such arrangement is disclosed and claimed in commonly assigned U.S. Application Ser. No. 928,936, filed by Dennen J. Bunger on July 28, 1978. Another arrangement for the same purpose is disclosed and claimed herein.

SUMMARY OF THE INVENTION

This invention contemplates apparatus wherein a driving member is coupled to a driven member through a clutch of the type including a plurality of clutch discs alternately mounted to the driving member and to a clutch nut. A shaft member carrying the driven member is displaceably coupled to the clutch nut. Means are provided for preloading the discs whereby the discs are initially loaded for light intimate contact therebetween. The torque transmitted by the clutch is sufficient to cause the shaft member to be axially displaced relative to the clutch nut until an impact torque occurs, whereupon the clutch slips. The impact torque and the normal torque occur at the interface of the clutch nut and shaft member, and generate an axial force on the clutch nut which acts in a sense to increase the loading on the clutch discs and to thereby provide the clutch with the capability to transmit a higher torque. Clutch disc loading is thus developed as a function of the torque to be transmitted. Accordingly, the main object of this invention is to minimize impact torque peaks as are likely to occur.

BRIEF DESCRIPTION OF THE DRAWINGS

The single FIGURE in the drawing is a diagrammatic representation of variable load clutch apparatus according to the invention.

DESCRIPTION OF THE INVENTION

An input or driving member 2, suitably journalled by bearings 3 in a housing 5, drives an output or driven member 4 through a clutch designated generally by the numeral 6 and including a plurality of clutch discs designated by the numerals 8 through 22. Clutch discs 8 through 22 are mounted alternately to driving member 2 and to a clutch nut 24 on axial splines 25 and 27, respectively. Thus discs 8, 10, 12 and 14 are mounted to clutch nut 24 on axial spline 27 thereof, while discs 16, 18, 20 and 22 are mounted to driving member 2 on axial spline 25 thereof.

The clutch discs are captured between spacers 28 and 30 adjacent the inner surfaces of a driving member flange 29 and a clutch nut flange 31, respectively. A preload nut 26 is in threaded engagement with driving member 2 and is arranged to be tightened against the outer surface of preload nut flange 31, whereby the discs are clamped between spacers 28 and 30.

A spline shaft 32 carries an externally formed helical spline 34, while clutch nut 24 carries a mating spline 35 which is in engagement with spline 34.

Spline shaft 32 and driven member 4 are coupled through mating axial splines 33 and 37, respectively. Shaft 32 carries driven member 4 through an axially extending bolt 36 and associated nut 38 as shown in the FIGURE. The arrangement is such that the end of spline shaft 32 and driven member 4 are separated by a space 40 having spring washers 42 disposed therein and adjacent the spline shaft and driven member ends. Driven member 4 is disposed near an engine member designated by the numeral 44.

With the structural arrangement as shown and described, it will be understood that driving member 2 drives driven member 4 through clutch 6, and clutch nut 24 and spline shaft 32. Clutch discs 8 through 22 are preloaded through preload nut 26 so that initially the discs are in light intimate contact. The torque thus transmitted by clutch pack 6 is sufficient to cause spline shaft 32, carrying driven member 4, to move axially toward engine member 44, relative to clutch nut 24.

When a starter is energized, for example, driven member 4, carried by spline shaft 32 as aforenoted, engages engine member 44, i.e., the driven member and engine member mesh, and an impact torque occurs. Clutch 6 will slip under this impact torque. The impact torque and the normal torque are sensed at the interface of helical splines 34 and 35. This torque generates an axial force which acts on clutch nut 24 in a direction opposite to the direction of displacement of spline shaft 32 to increase the loading on discs 8 through 22, thereby increasing the torque transmitting capability of clutch 6. It will now be seen that the device as described automatically develops clutch disc loading directly as a function of the torque to be transmitted.

Spring washers 42 and a travel and load control dimension designated as A in the drawing are sized to limit the axial force imposed upon engine member 44 and the bearings supporting the system. The full engagement travel of driven member 4 relative to engine member 7 is designated as B in the drawing.

As heretofore noted spline shaft 32 and driven member 4 are coupled through axial splines 33 and 37. In the event travel and load control dimension A is reached before full engagement of driven member 4 and engine member 44 (dimension B), the spline coupling permits axial displacement of the driven member relative to spline shaft 32 until full engagement occurs.

It will be seen from the aforegoing description of the invention that the loading which determines the capacity of the clutch is not constant but is variable, starting at a low value to permit reduced impact torque and automatically increasing to carry the desired or normal torque.

It will also be seen that the variable load feature as aforenoted overcomes the disadvantage of heretofore known disc clutch arrangements wherein clutches set loosely enough to slip impact torque slip excessively under normal torque, and if set tightly enough to prevent slippage under normal torque do not slip under impact torque. Further, the purposes of the invention are accomplished with only the clutch elements and utilize the structural characteristics of the clutch to initiate engagement and subsequent clutch loading without resort to other extraneous elements as has heretofore been required in the art.

What is claimed is:

1. Variable load clutch apparatus for coupling a driving member and a driven member, comprising:
   clutch means including a plurality of clutch discs;
   a clutch member arranged in spaced relation to the driving member, with the clutch discs captured in the space between the clutch member and the driving member,
   the driving member including a flange having at least an inner surface;
   the clutch member including a flange having an inner surface and an outer surface;
   the inner surfaces of the flanges being in spaced relation;
   means coupled to the clutch member and carrying the driven member, with said means and clutch member being displaceable relative to each other;
   a first spacer adjacent the inner surface of the driving member flange;
   a second spacer adjacent the inner surface of the clutch member flange;
   the clutch discs mounted to the driving member and to the clutch member and captured between the first and second spacers;
   loading means displaceably arranged relative to the clutch member adjacent the outer surface of the clutch member flange and displaceable relative thereto for applying a light preload to the clutch discs captured in the space between the clutch member and the driving member to transmit a torque so that the means coupled to the clutch member and carrying the driven member is displaced relative to the clutch member until the driven member experiences an impact torque, whereupon the clutch means slips; and
   the clutch member being responsive to the transmitted torque and the impact torque for being displaced relative to the means coupled thereto in a sense to increase the load on the clutch discs which increases the torque transmitting capability of the clutch means.

2. Variable load clutch apparatus as described by claim 1, wherein:
   the means coupled to the clutch member and carrying the driven member carries an external helical spline;
   the clutch member carries an external helical spline; and
   the external helical splines are in mating engagement so that the means coupled to the clutch member and carrying the driven member, and the clutch member are displaceable relative to each other.

3. Variable load clutch apparatus as described by claim 1, wherein:
   the means coupled to the clutch member carries an external axial spline;
   the driven member carries an internal axial spline;
   the driven member is carried by said means by the mating engagement of the axial splines.

4. Variable load clutch apparatus as described by claim 3, wherein:
   the means coupled to the clutch member has an end in spaced relation to an end of the driven member carried by said means through the mating engagement of the axial splines; and
   resilient members are disposed within the space between the ends to maintain the spaced relation.

5. Variable load clutch apparatus as described by claim 4, wherein:
   the means coupled to the clutch member and carrying the driven member, with said means and clutch member being displaceable relative to each other, are arranged so that the displacement of said means relative to the clutch member is limited.

6. Variable load clutch apparatus as described by claim 5 wherein:
   the limited displacement and the sizing of the resilient members cooperating to limit the force developed by the driven member when said member carried by said means through the mating engagement of the axial splines is displaced therewith.

7. Apparatus as described by claim 6, wherein:
   the driven member is arranged for a controlled displacement before the impact torque is experienced; and
   the mating engagement of the axial splines permits displacement of the driven member relative to the carrying means and in a sense opposite to the displacement of the carrying means when the limited displacement occurs before the controlled displacement.

* * * * *